United States Patent
Yen et al.

(10) Patent No.: US 12,269,003 B2
(45) Date of Patent: Apr. 8, 2025

(54) EXTRACELLULAR VESICLE SEPARATION METHOD, COLLOIDAL PARTICLE AND PREPARATION METHOD THEREOF

(71) Applicant: Industrial Technology Research Institute, Hsinchu (TW)

(72) Inventors: Yu-Fang Yen, Hsinchu (TW); Chien-An Chen, New Taipei (TW); Cheng-Tai Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 899 days.

(21) Appl. No.: 17/134,496

(22) Filed: Dec. 28, 2020

(65) Prior Publication Data

US 2021/0197162 A1    Jul. 1, 2021

Related U.S. Application Data

(60) Provisional application No. 62/954,670, filed on Dec. 30, 2019.

(51) Int. Cl.
| | | |
|---|---|---|
| C08B 37/00 | (2006.01) | |
| B01D 15/20 | (2006.01) | |
| B01D 15/38 | (2006.01) | |
| B01D 15/42 | (2006.01) | |
| B01J 13/04 | (2006.01) | |
| B01J 13/18 | (2006.01) | |
| B01J 13/20 | (2006.01) | |

(52) U.S. Cl.
CPC .......... B01J 13/185 (2013.01); B01D 15/206 (2013.01); B01D 15/38 (2013.01); B01D 15/426 (2013.01); B01J 13/04 (2013.01); B01J 13/20 (2013.01); C08B 37/0039 (2013.01); *B01D 2221/10* (2013.01)

(58) Field of Classification Search
CPC ................................................ C08B 37/0039
See application file for complete search history.

(56) References Cited

U.S. PATENT DOCUMENTS

| | | | |
|---|---|---|---|
| 9,671,321 B2 | 6/2017 | Vlassov et al. | |
| 2007/0069408 A1* | 3/2007 | Cheng ...................... | B01J 13/04 264/4.1 |
| 2007/0212540 A1 | 9/2007 | Cheng et al. | |
| 2013/0165533 A1* | 6/2013 | Liao ...................... | B01J 13/0039 516/98 |
| 2014/0004601 A1 | 1/2014 | Lim | |

FOREIGN PATENT DOCUMENTS

| | | |
|---|---|---|
| CN | 1939582 | 12/2010 |
| CN | 102397565 | 4/2012 |
| CN | 106714781 | 5/2017 |
| CN | 106841635 | 6/2017 |
| CN | 108918228 | 11/2018 |
| CN | 109438590 | 3/2019 |
| CN | 109576207 | 4/2019 |
| CN | 109825472 | 5/2019 |
| EP | 3467059 | 4/2019 |
| JP | 2007077397 | 3/2007 |
| JP | 2011505237 | 2/2011 |
| JP | 2015510396 | 4/2015 |
| JP | 2017505753 | 2/2017 |
| JP | 2019191176 | 10/2019 |
| KR | 20190060720 | 6/2019 |
| TW | 201806605 | 3/2018 |
| WO | 2019040920 | 4/2019 |
| WO | 2019066485 | 4/2019 |
| WO | 2019122003 | 6/2019 |
| WO | 2019164227 | 8/2019 |

OTHER PUBLICATIONS

Kostansek. Kirk-Othmer Encyclopedia of Chemical Technology. John Wiley & Sons, Inc. 2012. (Year: 2012).*
Meignier, B. Cell Culture on Beads used for the Industrial Production of Foot-and-Mouth Disease Virus. Develop. Biol. Standard. 1978, 42, 141-145. (Year: 1978).*
Inoue et al. A newly developed three-layer agarose microcapsule for a promising biohybrid artificial pancreas: rat to mouse xenotransplantation. Cell Transplantation, 1996, 5, S59-S63. (Year: 1996).*
"Office Action of Japan Counterpart Application", issued on May 10, 2022, p. 1-p. 3.
T W Munns et al., "Characterization of antibodies specific for N6-methyladenosine and for 7-methylguanosine," Biochemistry, vol. 16, No. 10, May 17, 1977, pp. 2163-2168.
Paul S.Rennie et al., "Methods for estimating the concentration of different forms of androgen receptor in rat ventral prostate," Molecular and Cellular Endocrinology, vol. 9, No. 2, Dec. 1, 1977, pp. 145-157.
Marta Monguió-Tortajada et al., "Extracellular vesicle isolation methods: rising impact of size-exclusion chromatography," Cellular and Molecular Life Sciences, vol. 76, No. 12, Mar. 19, 2019, pp. 2369-2382.
Nicolas Ioannidis, "Manufacturing of agarose-based chromatographic media with controlled pore and particle size," Jan. 1, 2019, pp. 1-214. Available at: http://etheses.bham.ac.uk/368/3/Ioannidis09PhD.pdf.
Cheng-Tai Chen et al., "Preparation of agarose microspheres for high-efficient separation of extracellular vesicles," Jul. 20, 2020, pp. 1-2. Available at: https://www.eventscribe.com/2020/ISEV/fsPopup.asp?efp=TUFSSEtGRkw5NzM3&PosterID=279942&rnd=0.597323&mode=posterinfo.

(Continued)

*Primary Examiner* — Stephen E Rieth
(74) *Attorney, Agent, or Firm* — JCIPRNET

(57) ABSTRACT

An extracellular vesicle separation method, a colloidal particle, and a preparation method thereof are provided. The colloidal particle is used for extracellular vesicle separation, and includes 2 wt % to 6 wt % of agarose. The colloidal particle has a particle size of 25 μm to 500 μm, and is surface-modified with biocompatible molecules. The biocompatible molecules include sodium carboxymethyl cellulose (CMC), methyl cellulose (MC), glycine, aspartic acid, glutamic acid, bovine serum albumin (BSA), fetal bovine serum (FBS), or a combination thereof.

5 Claims, 3 Drawing Sheets

(56) References Cited

OTHER PUBLICATIONS

"Search Report of Europe Counterpart Application", issued on May 28, 2021, p. 1-p. 11.
Mauryn C Nweke et al., "Mechanical characterisation of agarose-based chromatography resins for biopharmaceutical manufacture", Journal of Chromatography A, Nov. 20, 2017, pp. 129-137.
"Office Action of Taiwan Counterpart Application", issued on Dec. 10, 2021, p. 1-p. 8.
Izon, "qEV Exosome Isolation," Apr. 2015, pp. 1-36, Available at: https://izon.com/exosome-isolation/.
Hayrullah Yilmaz et al., "Resolution of (±)-β-Methylphenylethylamine by a Novel Chiral Stationary Phase for Pirkle-Type Column Chromatography", Chiraiity, Jun. 3, 2009, pp. 252-257, vol. 22, No. 2.
"Office Action of Europe Counterpart Application", issued on Mar. 14, 2024, p. 1-p. 5.

* cited by examiner

EXTRACELLULAR VESICLE SEPARATION METHOD, COLLOIDAL PARTICLE AND PREPARATION METHOD THEREOF

CROSS-REFERENCE TO RELATED APPLICATION

This application claims the priority benefit of U.S. Provisional Application No. 62/954,670, filed on Dec. 30, 2019. The entirety of the above-mentioned patent application is hereby incorporated by reference herein and made a part of this specification.

BACKGROUND

Technical Field

The disclosure relates to a separation method, a colloidal particle and a preparation method thereof, and particularly relates to a separation method, a colloidal particle and a preparation method thereof regarding extracellular vesicles.

Description of Related Art

Extracellular vesicles (EVs), a collective term for referring to various vesicles having a membrane structure, have a diameter ranging from 30 nm to 40 nm to 8 μm to 9 μm, are secreted by various types of cells to the surrounding environment, and may be found their present in blood, urine, saliva, and other body fluids. At present, the functionality of the extracellular vesicles has not been completely elucidated, and the conventional literature documents believe that they can regulate the interaction between the host and the pathogens, participate in various pathological processes such as infectiousness, neurological diseases, and cancers, and also play the important function of conducting intercellular communication in normal physiological processes at the same time. The extracellular vesicles also have potential in many applications in clinical medicine, mainly since they are rich in biomarkers, and are applicable in monitoring clinical status, treatment response, disease progression, etc. At the same time, they are also capable of delivering biomolecules and have considerable potential for the development of clinical drug carriers.

The conventional gold standard method of extracellular vesicle separation is ultracentrifugation, which takes at least 12 hours, and the maximum recovery rate is no more than 20% under centrifugation at the ultra-high speed. Although high-purity extracellular vesicles can be obtained, the recovery rate is very low. In recent years, many extracellular vesicle separation methods or devices, such as polyethylene glycol precipitation method, immunomagnetic bead purification method, microfluidic purification device, etc., have been developed and disclosed in various literature documents or patents, but none of them meet the requirements of high recovery rate, time saving, and high purity at the same time.

Therefore, it appears increasingly important to develop an extracellular vesicle separation method that achieves the purpose of high recovery rate, time saving, and high purity at the same time.

SUMMARY

The disclosure provides an extracellular vesicle separation method, a colloidal particle and a preparation method thereof, in which a separation column is filled with a chemically synthesized colloidal particle to separate extracellular vesicles, so as to achieve the purpose of high recovery, time saving, and high purity at the same time.

The preparation method of a colloidal particle of the disclosure includes the following steps. An agarose solution is prepared with a concentration of 2 wt % to 6 wt % with water and agarose and heated to 90° C. to 100° C., and a surfactant with a concentration of 5 wt % to 20 wt % and a mineral oil with a concentration of 50 wt % to 60 wt % are added into the agarose solution for emulsification to form a first colloidal material. After that, the first colloidal material is sieved with a sieve to obtain a second colloidal material with a particle size ranging from 25 μm to 500 μm, and the second colloidal material is washed with a detergent to remove oil stains and impurities. Next, a cross-linking agent with a concentration of 0.1 M to 0.5 M is added into the washed second colloidal material to form a third colloidal material through stirring. Lastly, the third colloidal material is washed with an organic solvent, and then the third colloidal material is surface-modified with a modification solution to obtain a colloidal particle surface-modified with biocompatible molecules. The modification solution includes sodium carboxymethyl cellulose (CMC), methyl cellulose (MC), glycine, aspartic acid, glutamic acid, bovine serum albumin (BSA), fetal bovine serum (FBS), or a combination thereof.

The colloidal particle of the disclosure is used for extracellular vesicle separation, includes 2 wt % to 6 wt % of agarose, has a particle size of 25 μm to 500 μm, and is surface-modified with biocompatible molecules. The biocompatible molecules includes sodium carboxymethyl cellulose (CMC), methyl cellulose (MC), glycine, aspartic acid, glutamic acid, bovine serum albumin (BSA), fetal bovine serum (FBS), or a combination thereof.

The extracellular vesicle separation method of the disclosure includes the following steps. The above-mentioned colloidal particle is provided. The colloidal particle is filled into a column, and lightly pressed with a sieve plate to be surface-aligned. After that, a biological sample is added into the column after the column is rinsed with a PBS buffer solution multiple times, and the biological sample and the colloidal particle in the column act at a temperature of 18° C. to 24° C. Next, a PBS buffer solution is added into the column for elution and/or centrifugation, and a middle part of an eluent is collected. The middle part of the eluent contains extracellular vesicles.

Based on the foregoing, the colloidal particle of the disclosure is used for extracellular vesicle separation, includes 2 wt % to 6 wt % of agarose, has the particle size of 25 μm to 500 μm, and is surface-modified with the biocompatible molecules. Through filling the column with the colloidal particle of the disclosure to separate extracellular vesicles, high-purity extracellular vesicles are obtained at a high recovery rate within a short time period, so as to achieve the purpose of high recovery rate, time saving, and high purity at the same time.

To make the aforementioned features and advantages of the disclosure more comprehensible, several embodiments accompanied with drawings are described in detail as follows.

DESCRIPTION OF THE EMBODIMENTS

Hereinafter, embodiments accompanied with drawings are described in detail as follows, but the embodiments provided are not used to limit the scope of the disclosure. Besides, terms "comprise", "include", "have", etc. used herein are all open-ended terms, namely meaning "including but not limited to".

Figure 1:
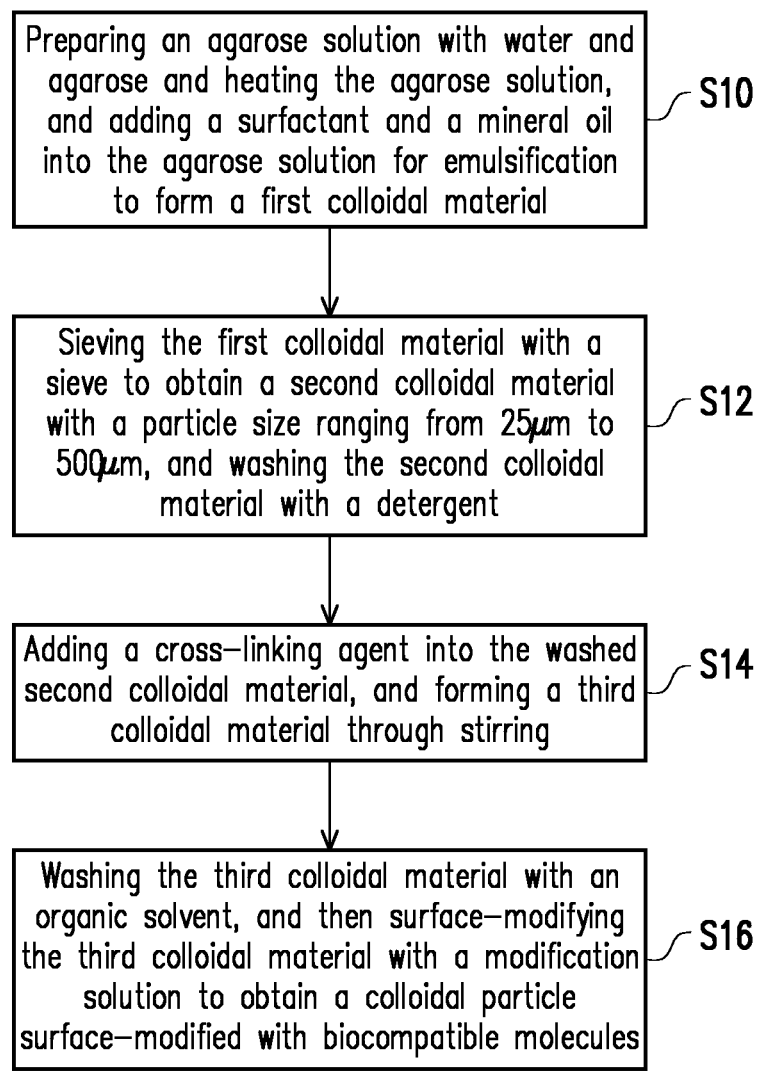
FIG. 1 is a schematic flow chart of a preparation method of a colloidal particle according to an embodiment of the disclosure.

The disclosure provides a preparation method of a colloidal particle, and the prepared colloidal particle is mainly used for extracellular vesicle separation. FIG. 1 is a schematic flow chart of a preparation method of a colloidal particle according to an embodiment of the disclosure. Hereinafter, a preparation method of a colloidal particle according to an embodiment of the disclosure will be described in detail with FIG. 1.

With reference to FIG. 1, firstly, step S10 is performed. An agarose solution with a concentration of, for example, 2 wt % to 6 wt % is prepared with water and agarose, and heated to about 90° C. to 100° C. (e.g., heating with a microwave oven or an autoclave). Then, a surfactant with a concentration of, for example, 5 wt % to 20 wt % and a mineral oil with a concentration of, for example, 50 wt % to 60 wt %, are added into the agarose solution for emulsification to form a first colloidal material. More specifically, the surfactant may include Triton X-100, Tween 20, Tween 80, Span 80, or a combination thereof.

In step S10 of the embodiment of the disclosure, agarose solutions with different percentage concentrations may be prepared through adjusting the ratio between water and agarose to produce agarose gel with different pore sizes, while a size of the colloidal particle may be adjusted through adjusting the type and ratio of the emulsifier. Theoretically, as the percentage concentration of the agarose solution increases, the pore size decreases. However, different hardnesses and molecular weights of the agarose gel also affect the pore size. At present, for a pore range applicable to extracellular vesicle separation, an agarose solution is adopted with a concentration of approximately 2 wt % to 6 wt %, for example, about 2.2 wt % to 5.8 wt %, about 2.5 wt % to 5.5 wt %, about 2.8 wt % to 5.3 wt %, about 3 wt % to 5 wt %, about 3.3 wt % to 4.7 wt %, about 3.5 wt % to 4.5 wt %, about 2.25 wt % to 2.75 wt %, about 2.75 wt % to 3.25 wt %, about 3.25 wt % to 3.75 wt %, about 3.75 wt % to 4.25 wt %, about 4.25 wt % to 4.75 wt %, about 4.75 wt % to 5.25 wt %, about 5.25 wt % to 5.75 wt %, etc., but is not limited thereto.

In step S10 of the embodiment of the disclosure, the method of heating the prepared agarose solution may include heating with a microwave oven or an autoclave, but is not limited thereto. The heating temperature may be about 90° C. to 100° C., for example, about 90° C. to 92° C., about 92° C. to 95° C., about 95° C. to 98° C., about 98° C. to 100° C., about 93° C., about 97° C., and about 99° C., but is not limited thereto.

In step S10 of the embodiment of the disclosure, the surfactant used may include Triton X-100 (2-(2-[4-(1,1,3,3-Tetramethylbutyl) phenoxy]ethoxy) ethanol), Tween 20 (polyoxyethylene sorbitan monolaurate), Tween 80 (polyoxyethylene sorbitan monooleate), Span 80 (sorbitan monooleate), or a combination thereof, but is not limited thereto. A concentration of the surfactant used may be about 5 wt % to 20 wt %, for example, about 6 wt % to 18 wt %, about 8 wt % to 16 wt %, about 10 wt % to 15 wt %, etc., but is not limited thereto.

In step S10 of the embodiment of the disclosure, the mineral oil used may include paraffin oil, naphthenic oil, or aromatic oil, but is not limited thereto. A concentration of the mineral oil used may be about 50 wt % to 60 wt %, for example, about 52 wt % to 55 wt %, about 55 wt % to 58 wt %, about 53 wt %, about 56 wt %, or about 59 wt %, but is not limited thereto.

Next, with further reference to FIG. 1, step S12 is performed. The first colloidal material is sieved with a sieve to obtain a second colloidal material with a particle size ranging from 25 μm to 500 μm, and then the second colloidal material is washed with a detergent. In step S12 of the embodiment of the disclosure, the detergent used may include sodium dodecyl sulfate (SDS), sodium deoxycholate (DOC), cetyltrimethylammonium bromide (CTAB), or a combination thereof. During washing, a certain amount of the detergent may be applied to the second colloidal material once or multiple times, and the detergent used may further be combined with an organic solvent for washing, so as to further wash up the oil stains. The organic solvent used in combination may include n-hexane, alcohol solution, or the like or a combination thereof, but is not limited thereto. For example, if 80 ml of the second colloidal material is used in the reaction, it may first be washed with 250 ml of a 1% SDS aqueous solution and then be washed with 100 ml of n-hexane, to get the oil stains off, and after being filtered, it may be washed with 80 ml of a 20% alcohol solution three times, and finally be washed with 80 ml of water three times.

Next, with further reference to FIG. 1, step S14 is performed. The washed second colloidal material is added with a cross-linking agent with a concentration of about 0.1 M to 0.5 M to form a third colloidal material through stirring. More specifically, the cross-linking agent may include epichlorohydrin, 1,3-dichloro-2-propanol (DCP), 2,3-dibromopropanol, divinyl sulfone, bis-oxiranes, or a combination thereof.

In step S14 of the embodiment of the disclosure, a concentration of the cross-linking agent used may be, for example, about 0.15 M to 0.45 M, about 0.2 M to 0.4 M, about 0.25 M to 0.35 M, etc., but is not limited thereto.

Finally, with further reference to FIG. 1, step S16 is performed. The third colloidal material is washed with an organic solvent, and then the third colloidal material is surface-modified with a modification solution to obtain a colloidal particle surface-modified with biocompatible molecules. More specifically, the organic solvent used is applied to the third colloidal material in a certain amount once or multiple times. The organic solvent may include acetone, ethanol, methanol, or a combination thereof, in which a concentration of ethanol is, for example, 20% to 75%, a concentration of methanol is, for example, 20% to 75%, and a concentration of acetone is, for example, 20% to 75%. For example, if 80 ml of the third colloidal material is used in the reaction, it is first washed with 80 ml of a 20% alcohol solution three times, and then washed with 80 ml of water three times. The amount of acetone is relatively small. Washing 40 ml of the third colloidal material only requires about 10 ml of acetone with a concentration of 75%. Washing with methanol is similar to ethanol, used with a concentration of, for example, 25% to 75%. Regarding the amount, 40 ml of the third colloidal material is washed with about 40 ml of methanol three times.

In step S16 of the embodiment of the disclosure, the modification solution may include sodium carboxymethyl cellulose (CMC), methyl cellulose (MC), glycine, aspartic acid, glutamic acid, bovine serum albumin (BSA), fetal bovine serum (FBS), or a combination thereof. More specifically, proteins such as bovine serum albumin (BSA) and fetal bovine serum (FBS) are biocompatible macromolecules, and an applicable molecular weight range is, for example, 3 kDa to 150 kDa. Amino acids such as glycine, aspartic acid, and glutamic acid are biocompatible small molecules, and an applicable molecular weight range is, for example, 1 Da to 500 Da. Sodium carboxymethyl cellulose (CMC) and methyl cellulose (MC) are biocompatible polymers, and an applicable molecular weight range is, for example, 10 kDa to 500 kDa.

In step S16 of the embodiment of the disclosure, the surface modification method may include an adsorption method or a covalent bonding method. In the adsorption method, after the third colloidal material undergoes the cross-linking reaction, biocompatible molecules are adsorbed on the surface of the colloidal particle directly through the column. In the covalent bonding method, after the third colloidal material undergoes the cross-linking reaction, exposed functional groups of the linker are covalently bonded to the biocompatible molecules. In this embodiment, the adsorption method is applicable to the biocompatible macromolecules or small molecules, and not applicable to the polymers for the sake of solubility. The covalent bonding method is applicable to the biocompatible macromolecules, small molecules, or polymers.

Moreover, the biocompatible molecules included in the modification solution can be selected according to the biological sample of the extracellular vesicles to be separated. For example, a modification solution that includes biocompatible macromolecules greatly increases the recovery rate of extracellular vesicles when the biological sample is a cell culture medium or a blood plasma sample. A modification solution that includes biocompatible small molecules exhibits a relatively intermediate recovery rate of extracellular vesicles but high purity of the recovered extracellular vesicles when the biological sample is a cell culture medium. When the biological sample is a blood plasma sample, the modification solution that includes biocompatible polymers exhibits a better recovery rate of extracellular vesicles than the modification solution that includes biocompatible small molecules.

Furthermore, in step S16 of the embodiment of the disclosure, when the third colloidal material is surface-modified with the modification solution, a concentration of the biocompatible molecules included in the modification solution may be about 0.1 M to 0.5 M, for example, about 0.15 M to 0.45 M, about 0.2 M to 0.4 M, about 0.25 M to 0.35 M, about 0.13 M, about 0.26 M, about 0.33 M, about 0.46 M, etc., but is not limited thereto. Through surface modification of the third colloidal material with a modification solution that includes biocompatible molecules, the recovery rate of extracellular vesicles is increased.

The disclosure also provides a colloidal particle made by the above-mentioned preparation method of a colloidal particle, which may be used for extracellular vesicle separation. The colloidal particle may include about 2 wt % to 6 wt % of agarose, has a particle size of, for example, 25 μm to 500 μm, and is surface-modified with biocompatible molecules. The biocompatible molecules may include sodium carboxymethyl cellulose (CMC), methyl cellulose (MC), glycine, aspartic acid, glutamic acid, bovine serum albumin (BSA), fetal bovine serum (FBS), or a combination thereof. Since the colloidal particle of the disclosure is surface-modified with biocompatible molecules, the recovery rate is effectively increased.

Moreover, for the colloidal particle provided in the embodiment of the disclosure, the preparation concentration of agarose, the heating condition, the concentrations of the surfactant and the mineral oil used, the particle size range of the second colloidal material obtained with a sieve, the detergent used to wash the second colloidal material, the cross-linking agent applied to the second colloidal material, the concentration of the cross-linking agent used, the organic solvent used to wash the third colloidal material, the biocompatible molecules applicable to modifying the surface of the third colloidal material, the applicable concentration of the modification solution, the surface modification degree of the colloidal particle, etc. are each similar to or the same as the scope or content recited in the preparation method of a colloidal particle for extracellular vesicle separation, and will not be repeatedly described herein.

Figure 2:
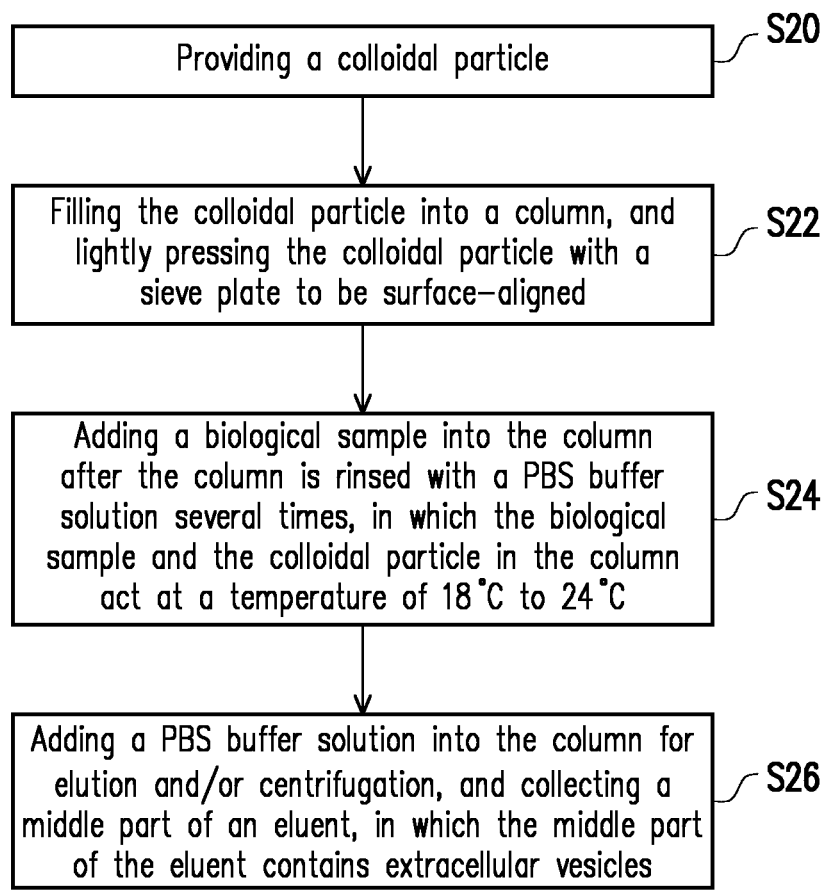
FIG. 2 is a schematic flow chart of an extracellular vesicle separation method according to an embodiment of the disclosure.

The disclosure also provides an extracellular vesicle separation method using the colloidal particle. FIG. 2 is a schematic flow chart of an extracellular vesicle separation method according to an embodiment of the disclosure. Hereinafter, the extracellular vesicle separation method of the embodiment of the disclosure will be described in detail with FIG. 2.

With reference to FIG. 2, firstly, step S20 is performed. A colloidal particle is provided. The colloidal particle is made by the preparation method described in FIG. 1 above, has the particle size and the composition mentioned above, and is surface-modified with biocompatible molecules. Detailed description has been provided above, and thus will not be repeated herein.

Next, with further reference to FIG. 2, step S22 is performed. The colloidal particle is filled into a column, and lightly pressed with a sieve plate to be surface-aligned. In this embodiment, the column may be a gravity chromatography column, a centrifugal column, or a pressurized column.

After that, with further reference to FIG. 2, step S24 is performed. A biological sample is added into the column after the column is rinsed with a PBS buffer solution several times, and the biological sample and the colloidal particle in the column act at a temperature of about 18° C. to 24° C., for example, acting at a temperature of about 19° C., 20° C., 21° C., 22° C., and 23° C., but is not limited thereto.

In this embodiment, the biological sample may include a cell culture medium, blood plasma, blood serum, urine, cerebrospinal fluid, or amniotic fluid, but the disclosure is not limited thereto. More specifically, when applied to a cell culture medium, it is preferable to use, for example, a colloidal particle containing 6 wt % of agarose, having a particle size of 74 μm to 500 μm, and being surface-modified with biocompatible small molecules. In addition, it is preferable to be operated under a pressurized condition, for example. When applied to blood plasma, it is preferable to use, for example, a colloidal particle containing 5 wt % of agarose, having a particle size of 37 μm to 125 μm, and being surface-modified with biocompatible polymers. In addition, it is preferably to be operated under a non-pressurized condition, for example.

Next, with further reference to FIG. 2, step S26 is performed. A PBS buffer solution is added into the column for elution and/or centrifugation, and a middle part of the eluent, which contains extracellular vesicles, is collected. In this way, the extracellular vesicle separation method of the disclosure is complete. In the extracellular vesicle separation method of the disclosure, a recovery rate may be greater than 50%, for example, greater than 60%, greater than 70%, greater than 80%, or even greater than 90%, and more than 99% of proteins are removed, so that a protein residue is less than 1%. The method, for example, is at a flow rate controlled at about 475 μl/min, for an operation duration less than 1 hour, achieving high separation efficiency. Besides, under a pressurized operating condition, the extracellular vesicles can be accelerated through the column to reduce a dilution ratio and increase the recovery rate of extracellular vesicles.

Hereinafter, the colloidal particle and the extracellular vesicle separation method proposed in the disclosure will be explained in detail through Experimental Examples. However, the following Experimental Examples are not used to limit the disclosure.

EXPERIMENTAL EXAMPLE

In order to prove that the colloidal particle of the disclosure effectively separates extracellular vesicles, the following Experimental Examples are particularly provided.

Experimental Example 1: Preparation of a Colloidal Particle (1) Preparation of an Agarose Particle 80 ml of water was mixed with 4.8 g of agarose, heated in a microwave oven or an autoclave, and heated at 90° C. for 2 hours for completely dissolved, so as to prepare a 6% agarose solution. Then, 13.5 ml of Span 80, 1.5 ml of Triton X-100, and 85 ml of a mineral oil were mixed evenly and heated to 95° C., then the 6% agarose solution was added thereinto for 30 minutes for emulsification. After the reaction was completed, the reaction temperature was lowered to room temperature. Afterwards, oil stains were washed off with a 1% SDS aqueous solution, and an agarose particle at 74 μm to 250 μm was collected through filtration. The particle was washed with 100 ml of n-hexane and 80 ml of 20% alcohol three times, and then was washed with 80 ml of double distilled water three times. 40 ml of 6% agarose particle (equivalent to the above-mentioned second colloidal material) at 74 μm to 250 μm were obtained.

(2) Cross-Linking Reaction

In a sodium hydroxide solution with a final concentration of 0.5 N, the 40 ml of agarose particle was reacted with 5 ml of epichlorohydrin, heated to 60° C. for reaction, and stirred overnight for cross-linking reaction, to obtain a third colloidal material equivalent to the above-mentioned.

(3) Surface Modification with Biocompatible Molecules

After the cross-linking reaction was completed, the colloidal material was again added with 5 ml of epichlorohydrin and reacted for 3 hours directly at a temperature of 60° C. to activate more functional groups. After that, the colloid material was filtered and washed with double distilled water three times to remove unreacted epichlorohydrin. In a sodium hydroxide solution with a final concentration of 1 N, the agarose particle with activated functional groups (the third colloidal material with activated functional groups) was added with 0.8 g of solid CMC biocompatible molecules and a glycine solution with a final concentration of 0.2 M, and reacted at a temperature of 60° C. overnight. After that, the reaction temperature was lowered to room temperature. After being filtered and washed with 40 ml of double distilled water three times, then washed with 40 ml of alcohol three times, and finally washed with 40 ml of double distilled water three times, a 6% agarose particle (equivalent to the above-mentioned colloidal particle) modified with CMC biocompatible molecules were collected for subsequent extracellular vesicle separation.

Experimental Example 2: Extracellular Vesicle Purification of Cancer Cell Culture Medium (1) Filling Chromatography Column A bottom of a column with a diameter of 8 mm, a length of 70 mm, and a total volume of about 3.5 ml was placed into a sieve plate, and was first rinsed with a PBS buffer solution. Then, the colloidal particle synthesized in Experimental Example 1 was drawn up and filled into the column with a dropper. After the colloidal particle sank to the height (70 mm) to be filled, the surface was aligned using the sieve plate to complete the colloid particle filling, and then the column was eluted with 10 ml of a PBS buffer solution to be balanced.

(2) Extracellular Vesicle Separation

100 μl of a culture medium of cell line SKBr3 of human breast cancer cells was injected from the top of the column. When the fluid level dropped to or below the sieve plate, the sample injection was completed. The sample was eluted with a PBS buffer solution, and the early, the middle, and the late parts of the eluent were collected, in which the middle part contained high-purity extracellular vesicles. 200 μL were collected per tube for a total of 24 tubes.

(3) Analysis of Sample Purity and Recovery Rate

A concentration and recovery rate of the sample was calculated with a nanoparticle tracking analysis (NTA) instrument, and it was confirmed with ELISA method that the particle each showed CD9/CD9 antibody activity, in which the CD9 antibody was purchased from BioLegend. The protein residue was identified with microBCA. The analysis result is as shown in FIG. 3 and Table 1.

Figure 3:
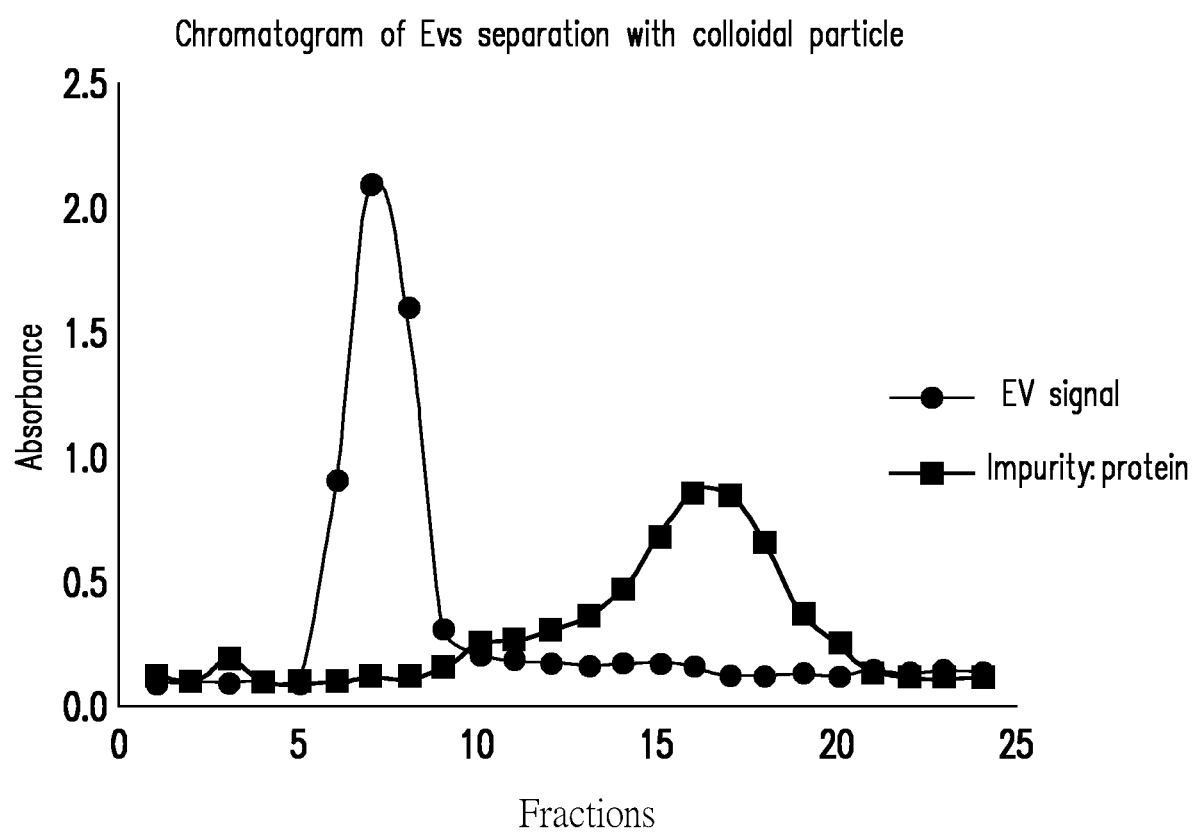
FIG. 3 is a chromatogram of extracellular vesicle separation with the colloidal particle provided in the disclosure.

FIG. 3 is a chromatogram of extracellular vesicle separation with the colloidal particle provided in the disclosure. Reference may be made to FIG. 3 and Table 1 together, in which an extracellular vesicle signal was measured by ELISA for CD9/CD9 signal, and a protein residue is measured by microBCA. Compared with the unpurified cancer cell culture medium, on the one hand, the CD9/CD9 signal obtained by ELISA was calculated to obtain the recovery rate, and on the other hand, it was confirmed that the colloidal particle each showed CD9/CD9 antibody activity. Herein, the collected early part of the eluent fractions 1 to 5 were blank samples, the fractions 6 to 9 showed a signal of an ELISA pair CD9/CD9 absorbance at 450 nm, and fractions 10 to 20 showed a protein signal of micro BCA absorbance at 562 nm. Moreover, according to Table 1, it indicates that the recovery rate of extracellular vesicles separated with the colloidal particle provided in the disclosure reaches about 85%, and the percentage of residual protein is about 0.072%.

TABLE 1

| Fraction | EV signal | Protein signal | EV recovery concentration (particles/ml) | Protein residue (μg/ml) |
| --- | --- | --- | --- | --- |
| 6 | 0.8974 | 0.0882 | 1.60E+08 | 0.00 |
| 7 | 2.0904 | 0.1053 | 1.03E+09 | 0.09 |
| 8 | 1.5889 | 0.1020 | 4.17E+08 | 2.23 |
| 9 | 0.3027 | 0.1441 | 3.68E+07 | 3.48 |

Experimental Example 3: Extracellular Vesicle Purification of a Glial Cell and Stem Cell Culture Medium (1) Filling Chromatography Column A bottom of a column with a diameter of 8 mm, a length of 70 mm, and a total volume of about 3.5 ml was placed into a sieve plate, and was first rinsed with a PBS buffer solution. Then, the colloidal particle synthesized in Experimental Example 1 was drawn up and filled into the column with a dropper. After the colloidal particle sank to the height (70 mm) to be filled, the surface was aligned using the sieve plate to complete the colloid particle filling, and then the column was eluted with 10 ml of a PBS buffer solution to be balanced.

(2) Extracellular Vesicle Separation

100 µl of a culture medium of glial cell line HCN-2 and stem cell line iPSC-derived mesenchymal stem cells (MSC) were respectively injected from the top of the column. When the fluid level dropped to or below the sieve plate, the sample injection was completed. The sample was eluted with a PBS buffer solution, and the early, the middle, and the late parts of the eluent were collected, in which the middle part contained high-purity extracellular vesicles. 200 µL were collected per tube for a total of 24 tubes.

(3) Sample Analysis

Since an extracellular vesicle signal of the glial cell is relatively low in general, antibody-magnetic beads with higher sensitivity were used to assist with recovery and confirm the recovery rate. Main components of the magnetic beads used included iron oxide and silicon dioxide. The size of the magnetic beads was about 180 nm. Different antibodies might be used in conjunction with each other. For example, a CD63 antibody and a CD81 antibody (CD63/CD81) may be used in conjunction, and may form antibody-magnetic beads (MP-CD63/CD81) if further bonded with the magnetic beads. The above-mentioned CD63 antibody was purchased from BD Pharmingen, and the CD81 antibody was purchased from BioVision. After being screened with a combination of different antibody-magnetic beads, and similarly compared with the unpurified cell culture medium, signals MP-CD63/CD81 (Example 1: glial cell) and MP-CD81/CD81 (Example 2: stem cell) with the strongest signals were screened out. Then, the recovery rates were respectively calculated and it was confirmed that the particles each showed antibody activity. At the same time, the protein residues were identified with microBCA. The analysis result is as shown in Table 2.

Table 2 shows the extracellular vesicle recovery rates and the percentages of residual protein of Example 1 and Example 2. According to Table 2, it indicates that using the colloidal particle of the disclosure for extracellular vesicle separation significantly increases the recovery rate, while maintaining a percentage of protein residue of less than 1%.

Experimental Example 4: Applicable to Both Small Volume and Large Volume Samples The experimental operating condition and procedure of Example 3 are basically the same as those of Example 2 of Table 2 above, and the difference lies in that in the sample analysis, instead of the antibody-magnetic bead method, the CD9/CD9 signal detected with ELISA was used to compare with the unpurified cell culture medium, calculate the recovery rate of extracellular vesicles, and confirm that the colloidal particles each showed CD9/CD9 antibody activity.

The Experimental Operation Details of Example 4 are as Follows:

(1) Filling Chromatography Column

A bottom of a column with a diameter of 30 mm, a length of 130 mm, and a total volume of about 92 ml was placed into a sieve plate, and was first rinsed with a PBS buffer solution. Then, the colloidal particle synthesized in Experimental Example 1 was drawn up and filled into the column with a dropper. After the colloidal particle sank to the height (130 mm) to be filled, the surface was aligned using the sieve plate to complete the colloid particle filling, and then the column was eluted with 270 ml of a PBS buffer solution to be balanced.

(2) Extracellular Vesicle Separation 10 ml of a culture medium of stem cell line iPSC-derived mesenchymal stem cells (MSC) was injected from the top of the column. When the fluid level dropped to or below the sieve plate, the sample injection was completed. The sample was eluted with a PBS buffer solution, and the early, the middle, and the late parts of the eluent were collected, in which the middle part contained high-purity extracellular vesicles. 200 µL were collected per tube for a total of 24 tubes.

(3) Sample Analysis

The CD9/CD9 signal detected with ELISA was compared with the unpurified cell culture medium, the recovery rate of extracellular vesicles was calculated, and it was confirmed that the colloidal particles each showed CD9/CD9 antibody activity, in which the CD9 antibody was purchased from BioLegend. The protein residue was identified with microBCA. The analysis results are as shown in Table 3.

Table 3 shows the extracellular vesicle recovery rates and the percentages of residual protein of Example 3 and Example 4. According to Table 3, it indicates that, through using the colloidal particle of the disclosure for extracellular vesicle separation, regardless for a small volume sample or a large volume sample, the recovery rates are each higher than 60%. The large volume sample even reaches a recovery rate higher than 90%, while maintaining a percentage of protein residue of less than 1%.

TABLE 2

| | Sample source/volume | EV label | recovery rate | Protein residue (µg/ml) |
|---|---|---|---|---|
| Example 1 | Glial cells 100 µl | MP-CD63/CD81 | 67% | 3.94(~0.08%) |
| Example 2 | Stem cell 100 µl | MP-CD81/CD81 | 74% | 2.5(~0.39%) |

TABLE 3

| | Sample source/volume | EV label | Recovery rate | Protein residue (µg/ml) |
|---|---|---|---|---|
| Example 3 | Stem cell 100 µl | CD63/CD81 | 61% | 2.5(~0.39%) |
| Example 4 | Stem cell 10 ml | CD81/CD9 | 93.7% | 10.5(<1%) |

Experimental Example 5: Extracellular Vesicle Purification of Blood Plasma Sample (1) Filling Chromatography Column A bottom of a column with a diameter of 8 mm, a length of 70 mm, and a total volume of about 3.5 ml was placed into a sieve plate, and was first rinsed with a PBS buffer solution. Then, the colloidal particle synthesized in Experimental Example 1 (Example 5) or a colloidal particle without surface modification (Comparative Example 1) was drawn up and filled into the column with a dropper. After the colloidal particle sank to the height (70 mm) to be filled, the surface was aligned using the sieve plate to complete the colloid particle filling, and then the column was eluted with 10 ml of a PBS buffer solution to be balanced.

(2) Extracellular Vesicle Separation

100 μl of blood plasma sample was injected from the top of the column. When the fluid level dropped to or below the sieve plate, the sample injection was completed. The sample was eluted with a PBS buffer solution, and the early, the middle, and the late parts of the eluent were collected, in which the middle part contained high-purity extracellular vesicles. 200 μL were collected per tube for a total of 24 tubes.

(3) Sample Analysis

With the antibody-magnetic beads method (MP-CD9/CD9), it was confirmed that the collected extracellular vesicles each show antibody activity. The preparation method of the antibody-magnetic beads is the same as mentioned above, and will not be repeatedly described herein. At the same time, the protein residue was identified with microBCA. The analysis result is as shown in Table 4.

It should be noted that since sample sources were different, biomarkers contained therein were also different. Before being separated, the samples required to be screened with multiple pairs, and pairs with higher expression should be selected. Generally speaking, cancer cells have a higher CD9/CD9 expression, and stem cells express more of the CD81 series. As for blood plasma, since the protein contains more impurity, the extracellular vesicle signal is relative low. Therefore, the antibody-magnetic bead method was selected for assistance to increase detection sensitivity. However, the antibody-magnetic bead method is not limited to blood plasma samples, but also applicable to samples of other sources.

Table 4 shows the extracellular vesicle recovery rates and the percentages of residual protein of Example 5 and Comparative Example 1. According to Table 5, it indicates that, compared with Comparative Example 1 that used the colloidal particle without surface modification, Example 5 that used the colloidal particle surface-modified with biocompatible molecules provided in the disclosure shows a significantly higher recovery rate, and the degree of recovery is nearly twice or more than that without surface modification. At the same time, the percentage of protein residue is also lower.

TABLE 4

| | Sample source | EV label | Recovery rate | Protein residue (μg/ml) |
|---|---|---|---|---|
| Comparative Example 1 | blood plasma | MP-CD9/CD9 | 41% | 105(~0.14%) |
| Example 5 | blood plasma | MP-CD9/CD9 | 94% | 88(~0.12%) |

In summary of the foregoing, the disclosure provides a preparation method of a colloidal particle. The prepared colloidal particle may be used for extracellular vesicle separation, includes 2 wt % to 6 wt % of agarose, has the particle size of 25 μm to 500 μm, and is surface-modified with biocompatible molecules. Through filling the column with the colloidal particle of the disclosure to separate extracellular vesicles, high-purity extracellular vesicles are obtained at a high recovery rate within a short time period, achieving the purpose of high recovery rate, time saving, and high purity at the same time. Besides, the colloidal particle may be widely applied in the gravity chromatography column, centrifugal column, or pressurized column. Extracellular vesicles with a recovery rate greater than 50% or even greater than 90% can be obtained within 20 minutes, and more than 99% of proteins are removed, so that the percentage of protein residue is less than 1%.

What is claimed is:

1. A preparation method of a colloidal particle, the colloidal particle being used for extracellular vesicle separation, and the preparation method comprising:

preparing an agarose solution with a concentration of 2 wt % to 6 wt % with water and agarose and heating the agarose solution to 90° C. to 100° C., and adding a surfactant and a mineral oil into the agarose solution for emulsification to form a first colloidal material;

sieving the first colloidal material with a sieve to obtain a second colloidal material with a particle size ranging from 25 μm to 500 μm, and washing the second colloidal material with a detergent to remove oil stains and impurities;

adding a cross-linking agent with a concentration of 0.1 M to 0.5 M into the washed second colloidal material to form a third colloidal material through stirring; and washing the third colloidal material with an organic solvent, and then surface-modifying the third colloidal material with a modification solution comprising biocompatible molecules to obtain a colloidal particle surface-modified with the biocompatible molecules, wherein the biocompatible molecules comprise sodium carboxymethyl cellulose (CMC), methyl cellulose (MC), glycine, aspartic acid, glutamic acid, bovine serum albumin (BSA), fetal bovine serum (FBS), or a combination thereof, wherein the detergent comprises sodium dodecyl sulfate (SDS), sodium deoxycholate (DOC), cetyltrimethylammonium bromide (CTAB), or a combination thereof.

2. The preparation method of a colloidal particle as described in claim 1, wherein the surfactant comprises 2-(2-[4-(1,1,3,3-tetramethylbutyl) phenoxy]ethoxy) ethanol, polyoxyethylene sorbitan monolaurate, and polyoxyethylene sorbitan monooleate, sorbitan monooleate, or a combination thereof.

3. The preparation method of a colloidal particle as described in claim 1, wherein the cross-linking agent comprises epichlorohydrin, 1,3-dichloro-2-propanol (DCP), 2,3-dibromopropanol, divinyl sulfone, bis-oxiranes, or a combination thereof.

4. The preparation method of a colloidal particle as described in claim 1, wherein the organic solvent comprises acetone, ethanol, methanol, or a combination thereof.

5. The preparation method of a colloidal particle as described in claim 1, wherein a concentration of the biocompatible molecules in the modification solution is 0.1 M to 0.5 M.

* * * * *